United States Patent
Agrawal (10) Patent No.: US 10,015,748 B2
(45) Date of Patent: Jul. 3, 2018

(54) METHOD AND APPARATUS FOR CHANGING AN OPERATING STATE OF A PORTABLE ELECTRONIC DEVICE

(71) Applicant: Motorola Mobility LLC, Chicago, IL (US)

(72) Inventor: Amit Kumar Agrawal, Bangalore (IN)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 14/963,309

(22) Filed: Dec. 9, 2015

(65) Prior Publication Data

US 2017/0171821 A1    Jun. 15, 2017

(51) Int. Cl.
*H04W 52/02*      (2009.01)
*H04M 1/725*      (2006.01)

(52) U.S. Cl.
CPC ... *H04W 52/0254* (2013.01); *H04M 1/72569* (2013.01)

(58) Field of Classification Search
CPC ......... H04M 1/72577; H04M 1/72572; H04M 2250/12; H04M 19/045; H04M 1/72569; H04M 1/72563; H04W 24/02; H04W 88/02; H04W 48/04; H04W 4/02; H04W 4/027; H04W 52/0254
See application file for complete search history.

(56) References Cited

U.S. PATENT DOCUMENTS

| | | | | |
|---|---|---|---|---|
| 9,350,852 | B1* | 5/2016 | Gudivada | H04M 1/72563 |
| 2005/0212758 | A1* | 9/2005 | Marvit | G06F 1/1613 |
| | | | | 345/156 |
| 2014/0315592 | A1* | 10/2014 | Schlub | H04B 1/3838 |
| | | | | 455/522 |
| 2015/0024728 | A1* | 1/2015 | Jang | H04M 1/72519 |
| | | | | 455/418 |
| 2016/0070297 | A1* | 3/2016 | Hsu | H04M 1/7253 |
| | | | | 345/2.3 |
| 2016/0127570 | A1* | 5/2016 | Choi | H04M 1/72563 |
| | | | | 455/567 |
| 2016/0132222 | A1* | 5/2016 | Yoo | G06F 3/0486 |
| | | | | 715/763 |
| 2016/0357616 | A1* | 12/2016 | Yu | G06F 1/3206 |

* cited by examiner

*Primary Examiner* — George Eng
*Assistant Examiner* — Umair Ahsan (57) ABSTRACT

A method and apparatus for changing an operating state includes a portable electronic device determining that the portable electronic device is in a first position for which a display face of the portable electronic device is directed upward with respect to a downward-directed gravitational field. The method also includes determining that the portable electronic device is undergoing rotational motion through a curved trajectory that takes the portable electronic device from the first position to a second position and determining that the portable electronic device is in the second position for which the display face of the portable electronic device is directed downward with respect to the gravitational field. The method further includes responsively changing the operating state of the portable electronic device from an active state to an inactive state.

20 Claims, 7 Drawing Sheets

# METHOD AND APPARATUS FOR CHANGING AN OPERATING STATE OF A PORTABLE ELECTRONIC DEVICE

FIELD OF THE DISCLOSURE

The present disclosure relates generally to a portable electronic device changing its operating state and more particularly to portable electronic device changing its operating state in response to being moved through a curved trajectory from a first position to a second position.

BACKGROUND

Modern electronics allow portable electronic devices to include considerable functionality while also having small form factors. Controlling features on such devices can be an involved process of navigating hierarchical menus and tapping tiny icons in various arrangements on an interactive touchscreen. This requires a level of dexterity and fine motor control that was not necessary to operate older devices having knobs and switches. A user wishing to change an operating state on a portable electronic device today must oftentimes be more focused on the task to complete it successfully.

BRIEF DESCRIPTION OF THE FIGURES

The accompanying figures, where like reference numbers refer to identical or functionally similar elements throughout the separate views, form part of the specification and illustrate embodiments in accordance with the included claims.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The method and device components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for changing an operating state of a portable electronic device. More specifically, the portable electronic device changes its operating state in response to being moved through a curved trajectory from a first position to a second position.

In accordance with the teachings herein, a method performed by a portable electronic device includes determining that the portable electronic device is in a first position for which a display face of the portable electronic device is directed upward with respect to a downward-directed gravitational field. The method also includes determining that the portable electronic device is undergoing rotational motion through a curved trajectory that takes the portable electronic device from the first position to a second position and determining that the portable electronic device is in the second position for which the display face of the portable electronic device is directed downward with respect to the gravitational field. The method further includes responsively changing the operating state of the portable electronic device from an active state to an inactive state.

Additionally in accordance with the teachings herein is a portable electronic device having a display located on a display face of the portable electronic device. The portable electronic device also has a processing element operatively coupled to the display. The processing element is configured to determine that the portable electronic device is in a first position for which the display face of the portable electronic device is directed upward with respect to a downward-directed gravitational field. The processing element is also configured to determine that the portable electronic device is undergoing rotational motion through a curved trajectory that takes the portable electronic device from the first position to a second position and determine that the portable electronic device is in the second position for which the display face of the portable electronic device is directed downward with respect to the gravitational field. The processing element is further configured to responsively change the operating state of the portable electronic device from an active state to an inactive state.

In one embodiment, the portable electronic device further includes a gravity sensor configured to detect a direction of the downward-directed gravitational field relative to positions of the portable electronic device. The processing element is operatively coupled to the gravity sensor and is further configured to determine the first and second positions using data received from the gravity sensor.

In another embodiment, the portable electronic device further includes one or both of an accelerometer configured to detect translational accelerations of the portable electronic device or a gyrometer configured to detect rotational accelerations of the portable electronic device. The processing element is operatively coupled to the one or both of the accelerometer or the gyrometer and is further configured to determine, using data received from the one or both of the accelerometer or the gyrometer, that the portable electronic device is undergoing the rotational motion through the curved trajectory.

In another embodiment, the portable electronic device further includes at least one thermal sensor configured to detect how the portable electronic device is being held. The processing element is operatively coupled to the at least one thermal sensor and is further configured to determine, using data received from the at least one thermal sensor, that the portable electronic device is being held in the second position between two hands. In a further embodiment, the processing element is configured to determine, using data received from the at least one thermal sensor, that the portable electronic device is being held with at least a threshold area of the display face of the portable electronic device being covered.

In another embodiment, the portable electronic device further includes at least one contact sensor configured to detect how the portable electronic device is being held. The processing element is operatively coupled to the at least one contact sensor and is configured to determine, using data received from the at least one contact sensor, that the portable electronic device is being held in the second position between two hands. In a further embodiment, the processing element is configured to determine, using data received from the at least one contact sensor, that the portable electronic device is being held with at least a threshold area of the display face of the portable electronic device being covered.

In another embodiment, the portable electronic device also includes at least one forward-facing camera configured to capture imagery from in front of the display face of the portable electronic device. The processing element is operatively coupled to the forward-facing camera and is configured to determine that the portable electronic device is in the first position by processing the captured imagery.

In another embodiment, the portable electronic device also includes at least one speaker configured to play audible alerts. The processing element is operatively coupled to the speaker and is configured to change the operating state of the portable electronic device from the active state to the inactive state by silencing an audible alert being played by the speaker.

A portable electronic device, also referred to simply as a device, is any electronic device capable of being moved, held, or carried by a user and configured with one or more operating states that can be active or inactive. A non-exhaustive list of portable electronic devices consistent with described embodiments includes smartphones, smartwatches, phablets, tablets, personal digital assistants, enterprise digital assistants, and other portable devices configured with at least one operating state.

An active operating state for a portable electronic device is a mode to which the portable electronic device is set or in which the portable electronic device is placed to function in a particular way that is distinguishable from the operating state being inactive. When active, an operating state is enabled, operative, or more resource intensive as compared to when the operating state is inactive. When inactive, the operating state is inoperative, disabled, or less resource intensive as compared to when the operating state is active.

In a first active operating state, for instance, a tablet is executing an application with which a user of the tablet is interacting using a touchscreen of the tablet. When the operating state is made inactive, the application is closed and no longer running on the tablet.

In a second active operating state, a speaker of a smartphone is playing a ringtone to audibly alert a user of the smartphone of an incoming call. When the operating state is made inactive, the ringtone is silenced and/or the call is rejected.

In a third operating state, a device is functioning to provide a level of performance. When the operating state is made inactive, the device is functioning at a reduced level of performance to conserve power.

Figure 1:
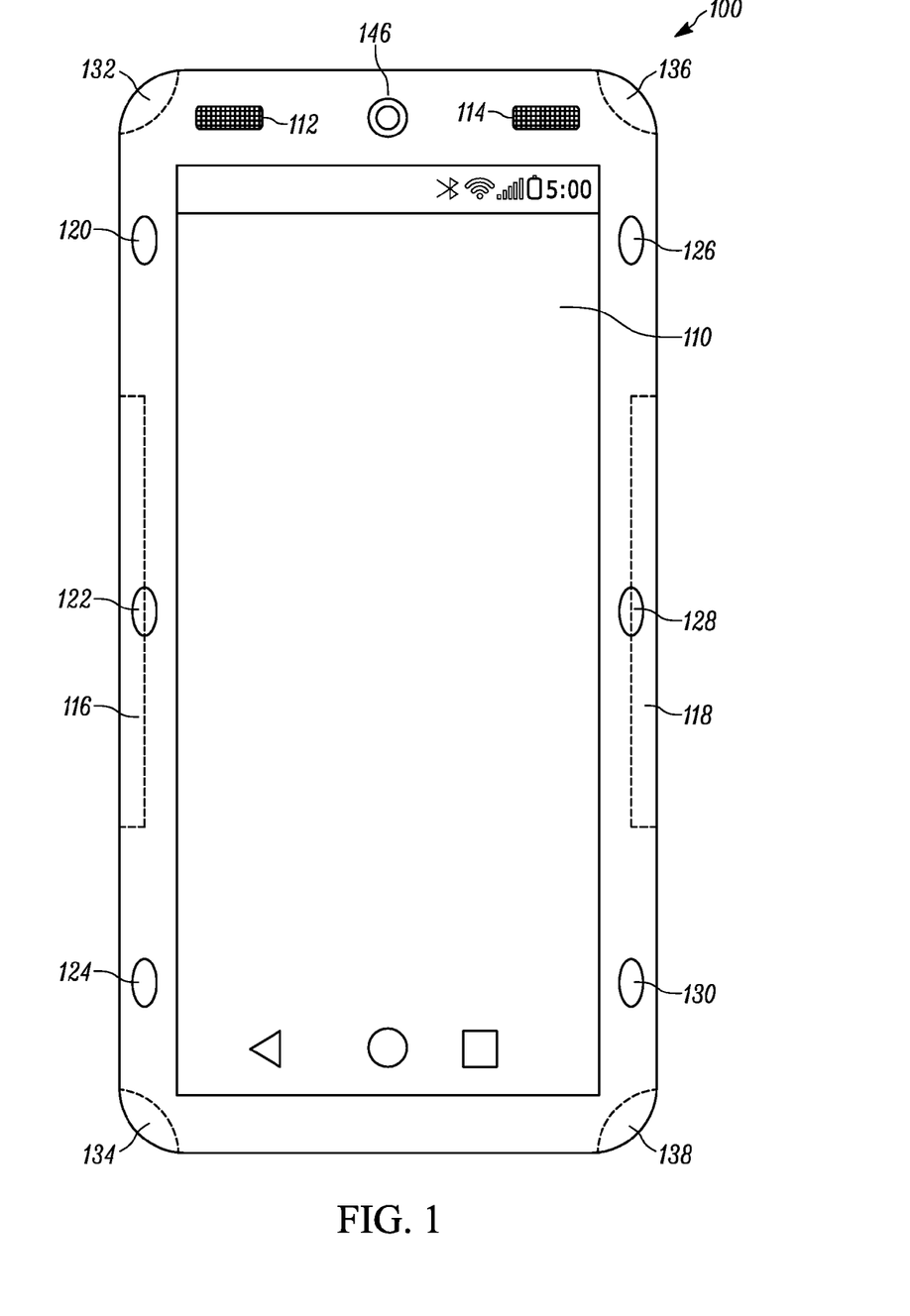
FIG. 1 shows a portable electronic device, in accordance with some embodiments.

FIG. 1 shows a portable electronic device, specifically a smartphone 100, which is referred to in describing included embodiments. The smartphone 100 is shown with a number of components, namely: a display 110; left 112 and right 114 stereo speakers; left 116 and right 118 contact sensors; forward-facing thermal sensors 120, 122, 124, 126, 128, 130; laterally directed thermal sensors 132, 134, 136, 138; and a camera 146. These components 110, 112, 114, 116, 118, 120, 122, 124, 126, 128, 130, 132, 134, 136, 138, 146 enable the smartphone 100 to function in accordance with described embodiments. In other embodiments, different devices having similar components are used to perform the functionality described herein with respect to the smartphone 100. These devices and their included components are represented by and described with reference to FIG. 2.

Figure 2:
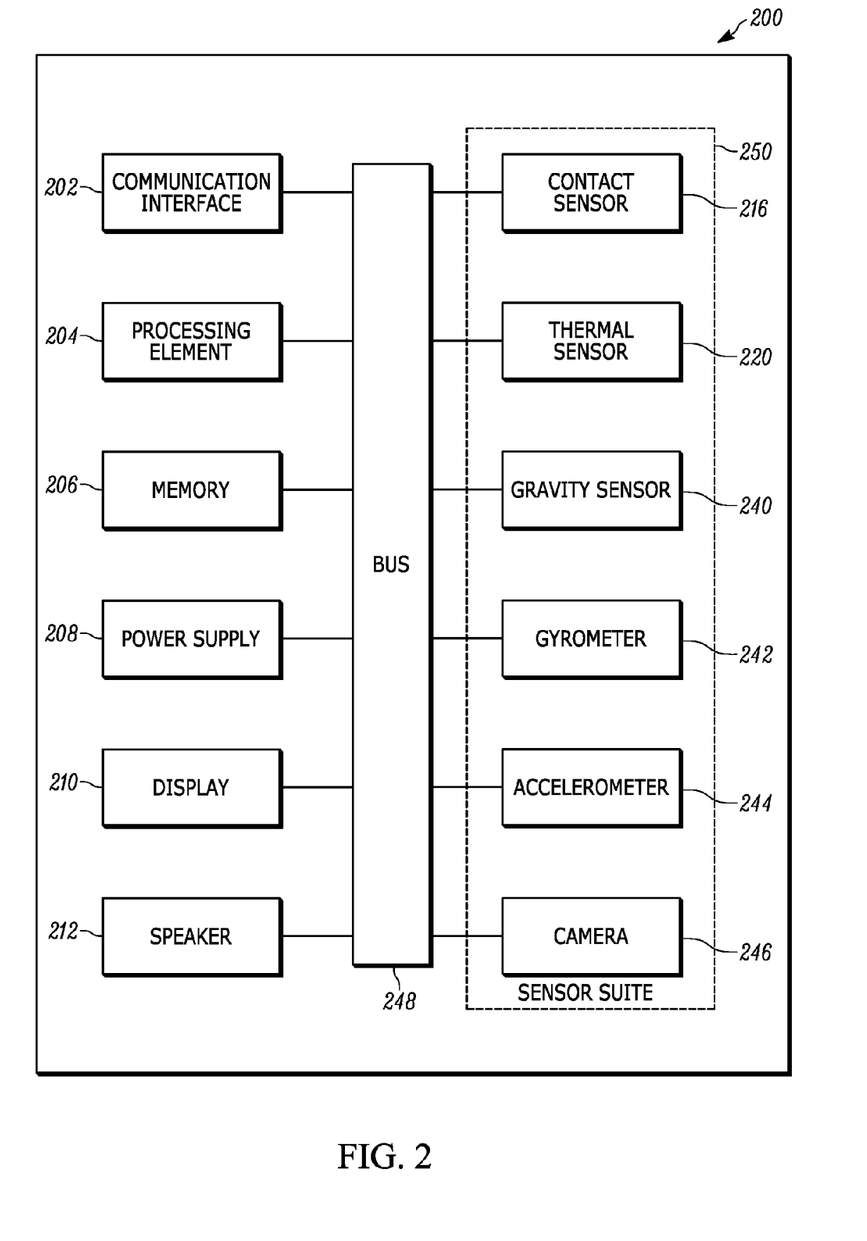
FIG. 2 shows a block diagram of a portable electronic device, in accordance with some embodiments.

FIG. 2 shows a block diagram of a nonspecific device 200 in accordance with embodiments of the present teachings. For a particular embodiment, the device 200 represents the smartphone 100. Included within the device 200 are a communication interface 202, a processing element 204, memory 206, a power supply 208, a display 210, and a speaker 212, which are all operationally interconnected by a bus 248. The device 200 also has a suite of sensors 250, which includes a contact sensor 216, a thermal sensor 220, a gravity sensor 240, a gyrometer 242, an accelerometer 244, and a camera 246. As shown, the sensor suite 250 is coupled to the processing element 204 though the bus 248. In other embodiments, some or all of the sensors 216, 220, 240, 242, 244, 246 in the sensor suite 250 can be coupled to the processing element 204 though a sensor hub.

A limited number of device components 202, 204, 206, 208, 210, 212, 216, 220, 240, 242, 244, 246, 248 are shown within the device 200 for ease of illustration. Other embodiments may include a lesser or greater number of components in a device. Moreover, other components needed for a commercial embodiment of a device that incorporates the components 202, 204, 206, 208, 210, 212, 216, 220, 240, 242, 244, 246, 248 shown for the device 200 are omitted from FIG. 2 for clarity in describing the enclosed embodiments.

The processing element 204, for instance, includes arithmetic logic and control circuitry necessary to perform the digital processing, in whole or in part, for the device 200 to detect rotational motion through a curved trajectory from a first position to a second position. For one embodiment, the processing element 204 represents a primary microprocessor, also referred to as a central processing unit (CPU), of the device 200. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components 202, 206, 208, 210, 212, 216, 220, 240, 242, 244, 246, 248 of the device 200 to perform at least some of their intended functionality.

The memory 206 provides storage of electronic data used by the processing element 204 in performing its functionality. For example, the processing element 204 can use the memory 206 to load programs and/or store files associated with changing an operating state of the device 200. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (micro SD) card to store files associated with functionality performed in conjunction changing an operating state.

One or more communication interfaces 202 allow for communication between the device 200 and other electronic devices, such as smartphones or laptops, configured to interact with the device 200. These other devices, for example, can initiate a phone-to-phone, a computer-to-phone, a phone-to-computer, or a computer-to-computer call to the device 200. The device 200 can also send one or more communications to other electronic devices associated with changing an operating state of the device 200.

For one embodiment, the communication interface 202 includes a cellular transceiver to enable the device 200 to receive calls and/or messages from and to send indications to other electronic devices using one or more cellular networks. Cellular networks can use any wireless technology that, for example, enables broadband and Internet Protocol (IP) communications including, but not limited to: $3^{rd}$ Generation (3G) wireless technologies such as CDMA2000 and Universal Mobile Telecommunications System (UMTS) networks; $4^{th}$ Generation (4G) technologies such as LTE and WiMAX; or $5^{th}$ Generation (5G) technologies.

In another embodiment, the communication interface 202 includes a wireless local area network (WLAN) transceiver that allows the device 200 to access the Internet using standards such as Wi-Fi. The WLAN transceiver allows the device 200 to send and receive radio signals to and from similarly equipped electronic devices using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

For additional embodiments, the communication interface 202 includes hard-wired connections to a network infrastructure that allows the device 200 to communicate electronically with other devices. For example, the communication interface 202 includes a socket that accepts an RJ45 modular connector which allows the device 200 to be connected directly to a network router by category-5 or category-6 Ethernet patch cable. The communication interface 202 can also use a cable modem or a digital subscriber line (DSL) to connect to the Internet, and thereby to other electronic devices, via an Internet service provider (ISP).

The display 210 is an output component of the device 200, which is configured to present information to a user visually. By viewing the display 210, for instance, the user sees an indication of a call being received, a volume setting on a song being played, a score of a game being played, an image of a picture being taken, content of webpage being loaded, or the appearance of a document being created. For some embodiments, the display 210 is also an input component, which is configured to allow the user to tactilely interface with the device 200. In one such embodiment, the display 210 is a touchscreen that allows the user to interact with displayed information. A tactile portion of the display 210, for example, can be overlaid on top of a visual portion of the display 210.

The speaker 212 is an output component of the device 200, which is configured to present information to a user audibly. For some embodiments, the speaker 212 generates alerts designed to notify the user of incoming calls, messages, and/or a current status of the device 200. The speaker 212, for example, generates an audible alert in the form of a ringtone to notify the user of an incoming call when the device 200 is a smartphone. The device 200 can also use the speaker 212 to play different audible alerts for different types of messages. An incoming text message, for example, might be accompanied by a default chime, whereas an incoming e-mail is accompanied by a user-selected tone.

In other embodiments, the speaker 212 is used to perform at least some of the functionality of an application executing on the device 200. When the device 200 is, or includes, a media player, for example, the speaker 212 plays a soundtrack or song. When the device 200 operates as a handheld game console, the speaker 212 generates audio effects. The speaker 212 can also work in conjunction with the display 210 in improving accessibility to the device 200 by providing operational assistance for a visually impaired user.

The sensors 216, 220, 240, 242, 244, 246 of the electronic device 200 are configured to detect if the device 200 is in a first or second position, or if the device 200 is undergoing rotational motion through a curved trajectory. Some or all of the sensors can work independently or in combination with one another to provide data to the processing element 204 to make a position or motion determination. The gravity sensor 240, for example, can detect that the device 200 is facing downward while the accelerometer 244 detects that the device 200 is not accelerating. Upon receiving the combined data from the gravity sensor 240 and the accelerometer 244, the processing element determines that the device 200 is in a second position.

The gravity sensor 240 detects the direction of a downward-directed gravitational field relative to the orientation of the device 200. In described embodiments, the downward-directed gravitational field is the gravitational field created by the mass of the Earth, which is directed from the surface of the Earth toward the Earth's center with an approximate magnitude of 9.8 meters per seconds squared ($m/s^2$). The downward-directed gravitational field, having both magnitude and direction, is represented by a three-dimensional gravity vector, which is simply referred to as "gravity." The gravity sensor 240, for example, provides data specifying the gravity vector relative to a Cartesian or a spherical coordinate system fixed with respect to the device 200. For some embodiments, the gravity sensor is an accelerometer calibrated, configured, or modified to specifically measure gravity.

The accelerometer 244 is configured to measure an acceleration of the device 200 in one or more directions. In different embodiments, the accelerometer 244 represents a single-axis accelerometer, a multiple-axis accelerometer, multiple single-axis accelerometers, or a combination of accelerometers of varying types. The accelerometer 244, for example, determines if the device 200 is speeding up or slowing down as it moves in a particular direction.

The gyrometer 242 detects an angular velocity or a rate of rotation about one or more axes. The gyrometer 242, for example, measures if and how the device 200 is moving along a curved trajectory. This can include angular movement in any one or more of three planes that define three-dimensional space. For some embodiments, the gyrometer 242 is a microelectromechanical system (MEMS) with integrated electronic and mechanical components. In one embodiment, the gyrometer 242 includes an application-specific integrated circuit (ASIC) and a micro-machined silicon sensor.

The camera 246 is configured to capture visual data, which is processed and analyzed to support a determination that the device 200 is in an upward-facing first position. Open sky appearing at the center of an image captured by the camera 246, for example, supports a determination that the device 200 is facing upward. By analyzing sequential frames of visual data captured by the camera 246 at different times, the processing element 204 determines if the device 200 is in motion. Further, if the device 200 is in motion, the processing element 204 determines from the visual data how the device 200 is moving. A quickly shifting vantage point of the camera 246 relative to its surroundings supports a determination that the device 200 is being rotated or moved through a curved trajectory. A gradually shifting vantage point, where scenery passes the camera 246 more slowly, supports a determination that the device 200 is moving translationally, such as when a user carrying the device 200 is walking.

The contact sensor 216 detects contact of the device 200 with another object, such as a table or a user's hand. In one embodiment, the contact sensor 216 monitors capacitance to detect anything contacting the device 200 that is conductive or has a dielectric constant different than air. In alternate embodiments, the contact sensor 216 utilizes a pressure-sensitive area or a photo sensor to register contact with the device 200. Where a pressure-sensitive area is used, a change in pressure indicates an object is being pressed against the device 200 with some force. For a photo sensor, an object that is in contact with the device 200 blocks ambient light from reaching the photo sensor. In some instances, the contact sensor 216 represents multiple contact sensors operating independently of one another at different locations on the device 200. The smartphone 100, for example, has its contact sensors 116 and 118 located along its left and right edges, respectively. When a user cradles the smartphone 100 in his left hand, his palm contacts the contact sensor 116 and his fingers contact the contact sensor 118. In another embodiment, the contact sensor 216 of the device 200 includes the display 210 operating as a touchscreen.

The thermal sensor 220 detects thermal contact or proximity of an object with the device 200. A user's hands, for example, are a source of heat. When the user handles the device 200, the thermal sensor 220 registers an elevation in temperature. For one embodiment, the thermal sensor 220 uses one or more thermocouples to detect an increase in temperature over an ambient temperature at the thermal sensor 220. In another embodiment, the thermal sensor 220 represents the forward-facing thermal sensors 120, 122, 124, 126, 128, 130 shown in FIG. 1. The thermal sensors 120, 122, 124, 126, 128, 130 are distributed in such a way to allow for a determination of how much of the front face of the smartphone 100 is being covered. If the user completely covers the front fact of the smartphone 100 with his hand, for example, then all the front-facing thermal sensors 120, 122, 124, 126, 128, 130 will register a thermal contact. Thermal contact with four of the forward-facing thermal sensors 120, 122, 124, 126, 128, 130 supports a determination that the user's hand is covering more than half but less than all of the smartphone's front face.

In further embodiments, the thermal sensor 220 also represents the laterally directed thermal sensors 132, 134, 136, 138 shown in FIG. 1. For one embodiment, the laterally directed thermal sensors 132, 134, 136, 138 register contact with another object by detecting its heat. In another embodiment, the laterally directed thermal sensors 132, 134, 136, 138 detect that the smartphone 100 is in motion relative to an object. For example, each laterally directed thermal sensor 132, 134, 136, 138 includes a plurality of thermocouples between dissimilar metals wired in series so their voltages add. To omit negative voltage contributions from the sum, every other thermocouple is covered in a thermally opaque material. The remaining thermocouples are not so covered and generate only positive voltage contributions when subjected to heat.

Within the housing of the smartphone 100, above each laterally directed thermal sensor 132, 134, 136, 138, alternating strips of thermally opaque and thermally transparent materials are used to create thermal gratings. As a heat source moves relative to a thermal grating, an angle of incidence for the heat source at the thermal grating changes. As the angle of incidence changes, heat from the heat source is alternatingly screened and passed by the thermal grating, resulting in voltage fluctuations from the thermal sensor underneath that are interpreted as movement. Comparing relative movement detected by each laterally directed thermal sensor 132, 134, 136, 138, aids in the determination that the smartphone 100 is moving through a curved trajectory.

The power supply 208 represents a power source that supplies electric power to the device components 202, 204, 206, 210, 212, 216, 220, 240, 242, 244, 246, 248, as needed, during the course of their normal operation. The power is supplied to meet the individual voltage and load requirements of the device components 202, 204, 206, 210, 212, 216, 220, 240, 242, 244, 246, 248 that draw electric current. For some embodiments, the power supply 208 is a wired power supply that provides direct current from alternating current using a full- or half-wave rectifier. For other embodiments, the power supply 208 is a battery that powers up and runs the device 200. For a particular embodiment, the battery 208 is a rechargeable power source. A rechargeable power source for a device is configured to be temporarily connected to another power source external to the device to restore a charge of the rechargeable power source when it is depleted or less than fully charged. In another embodiment, the battery is simply replaced when it no longer holds sufficient charge.

Figure 3:
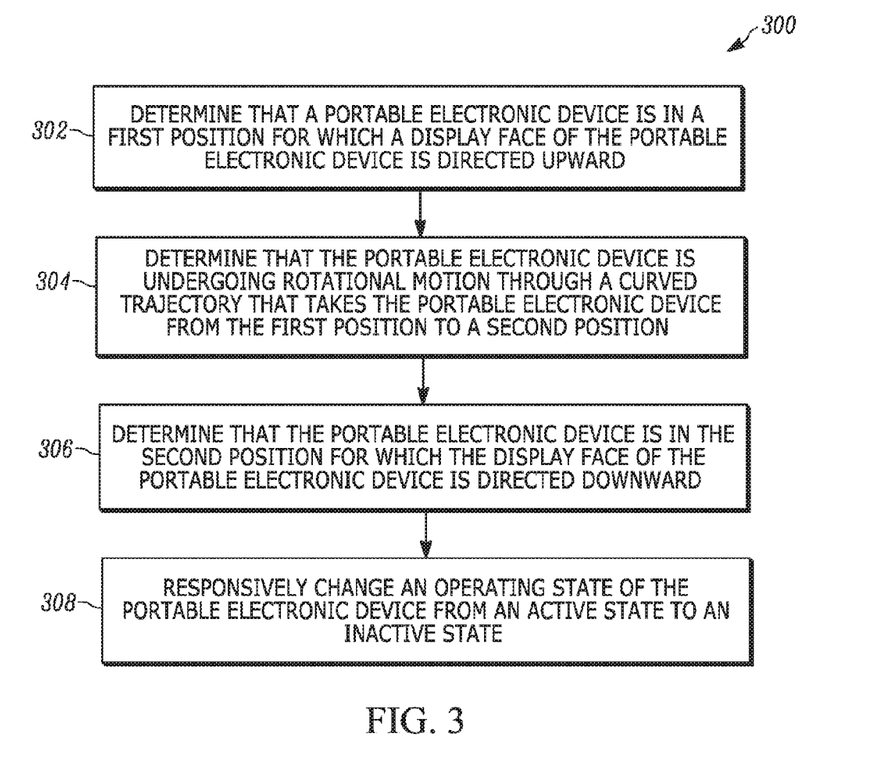
FIG. 3 shows a logical flow diagram illustrating a method for changing an operating state for a portable electronic device, in accordance with some embodiments.

With reference to the remaining figures, a detailed description of the functionality of the components shown in FIGS. 1 and 2 is given. FIG. 3 shows a logical flow diagram illustrating a method 300 performed by a portable electronic device, taken to be the smartphone 100, for changing its operating state. The method 300 begins with the smartphone 100 determining 302 that it is in a first position for which a display face of the smartphone 100 is directed upward with respect to a downward-directed gravitational field. A display face for a device refers to a side of the device on which a display for the device is located. This is the side a user typically or most frequently faces when interacting with the device. A first position for a device is an orientation of the device in which the display face of the device is directed fully or primarily opposite the direction of gravity. An indication that a display face of a device is in a first position is interpreted to mean that the device is in the first position. A more detailed description of a device in a first position with its display face directed upward with respect to a downward-directed gravitational field is provided in connection with FIG. 4.

Figure 4:
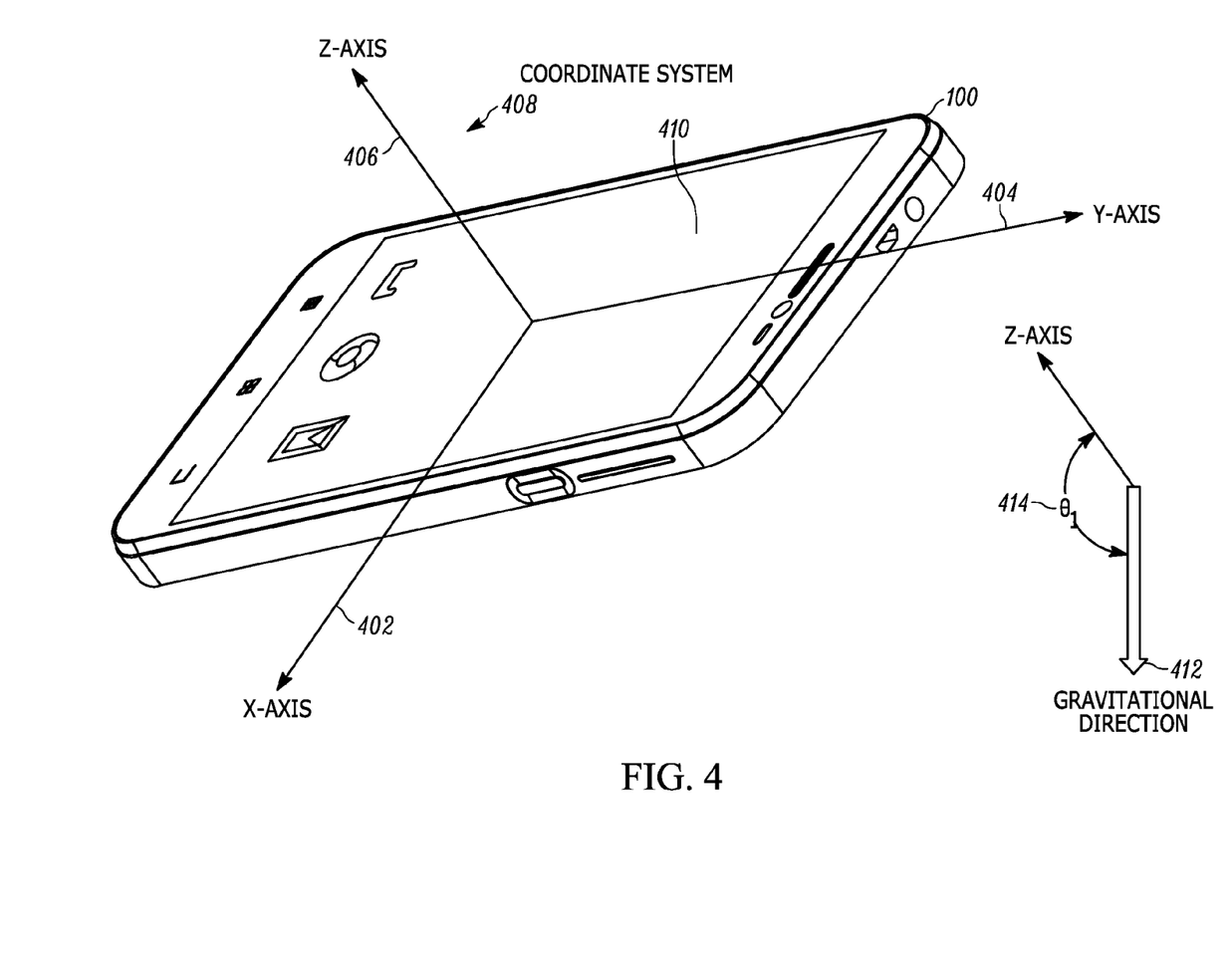
FIG. 4 shows a portable electronic device in a first position with a display face directed upward, in accordance with some embodiments.

FIG. 4 shows a portable electronic device, specifically, the smartphone 100, in a first position. The display face of the smartphone 100 is indicated at 410. The display face 410 is indicated as the front side of the smartphone 100 because the display 110 is located on the front side of the smartphone 100. In instances where a device has multiple displays, a primary display of the multiple displays determines which side of the device is the display face of the device. In one embodiment, the smartphone 100 has a smaller display located on its backside which identifies callers and allows a user to see the current time when the smartphone 100 is placed face-down on a table and the display 110 is not visible. The functionality of the smaller display is limited compared to the display 110. The display 110, therefore, serves as the primary display for the smartphone 100 and defines the front side of the smartphone 100 as the display face 410 of the smartphone 100.

A coordinate system is indicated at 408, which is fixed with respect to the smartphone 100. The coordinate system 408 is shown as a right-handed Cartesian coordinate system with its x-axis 402 and y-axis 404 in a plane defined by the display face 410 of the smartphone 100. A z-axis 406 of the coordinate system 408 is normal to the display face 410, with positive z-coordinates lying in front of the display face 410 and negative z-coordinates lying behind the display face 410. The gravity sensor 240 uses the coordinate system 408 to quantify or define a direction of gravity with respect to a current position of the smartphone 100.

A gravity vector is indicated at 412, which is directed downward, pointing toward the center of the Earth. The direction of the gravity vector 412 is fixed, whereas the directions of the x 402, y 404, and z 406 axes of the coordinate system 408 change with the orientation of the smartphone 100. As shown, the direction of the gravity vector 412 defines a polar angle $\theta_1$ 414 with the positive z-axis 406 of the coordinate system 408. For some embodiments, the gravity sensor 240 communicates the polar angle $\theta_1$ 414 to the processing element 204. The processing element 204 uses the polar angle $\theta_1$ 414 to determine if the smartphone 100 is in a first position with its display face 410 directed upward with respect to gravity.

For one embodiment, the display face 410 is directed upward with the smartphone 100 in a first position when a plane of the display face 410 is level with respect to gravity. In this case, the polar angle $\theta_1$ 414 measures 180 degrees with the positive z-axis 406 fully antiparallel to the gravity vector 412. For another embodiment, the display face is directed upward and the smartphone 100 is in a first position when the polar angle $\theta_1$ 414 is greater than a threshold angle. The smartphone 100 is in a first position with its display face 410 directed upward, for example, when the polar angle $\theta_1$ 414 is greater than a threshold angle of 130 degrees. If the defined direction of the positive z-axis 406 were reversed for the coordinate system 408, then the display face 410 would be directed upward in a first position with a polar angle of less than 50 degrees as determined using the new coordinate system.

For another embodiment, there is a second threshold angle the smartphone 100 uses to determine if it is in a second position with its display face 410 directed downward with respect to gravity. If the direction of the gravity vector 412 defines a polar angle $\theta_2$ with the positive z-axis 406 of the coordinate system 408 that is less than 20 degrees, for example, then the smartphone 100 determines it is in a second position.

The gravity sensor 240 can also specify the gravity vector 412 in terms of Cartesian coordinates rather than polar coordinates. For several embodiments, the gravity sensor 240 specifies the gravity vector 412 as an ordered triplet ($x_1$, $y_1$, $z_1$). If the smartphone 100 is the level first position, then the values of the $x_1$ and $y_1$ coordinates are zero, and the value of the $z_1$ coordinate is negative and equal in magnitude to the length of the gravity vector 412.

In some embodiments, the display face 410 of the smartphone 100 is directed upward in a first position while also being inclined with respect to the gravity vector 412. A user in a seated or standing position, for example, tilts the display 110 toward his face for a more comfortable viewing angle. Now the $y_1$ and $z_1$ coordinate values are both negative values with respect to the coordinate system 408. If the positive y-direction and z-direction for the coordinate system 408 were each reversed, then the $y_1$ and $z_1$ coordinate values would both be positive values with respect to the new coordinate system.

With the ordered triplet ($x_1$, $y_1$, $z_1$) describing the Cartesian components of the gravity vector 412 with respect to the coordinate system 408, the display face 410 of the smartphone 100 is directed upward with respect to gravity when the z-component of the gravity vector 412 is at least partially antiparallel to the positive z-axis 406 of the coordinate system 408. In further embodiments, the z-component of the gravity vector 412 is also longer than both its x-component and y-component. Accordingly, the display face 410 of the smartphone 100 is no longer in a first position, even for a negative $z_1$ component value, if the display face 410 of the smartphone 100 is tilted too far in either the x or y directions from being horizontally level. For example, the display face 410 is directed upward in a first position when the z-component is at least 100% the length of the x-component and 75% the length of the y-component. This results in an x-tilt threshold of 45 degrees and a y-tilt threshold of 53 degrees.

For one embodiment, the positive z-axis 406 is at least partially antiparallel to the gravity vector 412 with the polar angle $\theta_1$ 414 measuring greater than 90 degrees. The camera 146 captures an image from in front of the smartphone 100 and the processing element 204 processes the image to determine that a user is facing the display face 410 of the smartphone 100. Because the user is facing the display face 410 while the polar angle $\theta_1$ 414 is greater than 90 degrees, the processing element 204 further determines the smartphone 100 is in a first position.

Returning to FIG. 3, the description of the method 300 continues with the smartphone 100 determining 304 that it is undergoing rotational motion through a curved trajectory that takes it from the first position to a second position. The smartphone 100 also determines 306 that it is in the second position, for which its display face 410 is directed downward with respect to gravity, after undergoing the rotational motion. A device undergoing rotational motion means that the device is being turned or spun in time so that an angular position for the device changes. Rotating a device through an angle of 180 degrees about an axis of rotation, for instance, takes the device from a face-up orientation to a face-down orientation. Undergoing rotational motion through a curved trajectory means that as the device is rotating, it is also undergoing translational motion along a nonlinear path. A detailed description of rotational motion of the smartphone 100 through a curved trajectory from a first position to a second position is provided with reference to FIGS. 5, 6, 7, 8.

Figure 5:
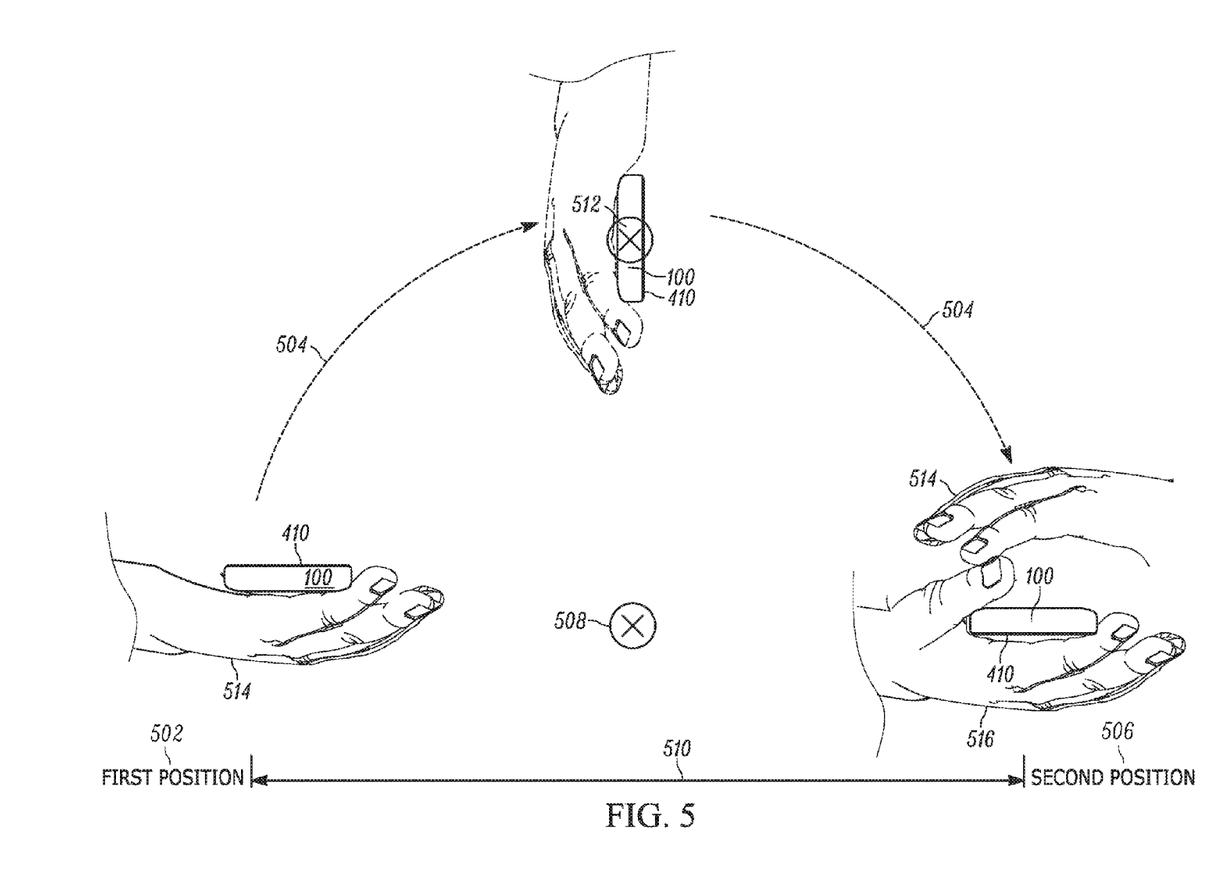
FIG. 5 shows a portable electronic device being moved through a curved trajectory from a first position to a second position, in accordance with some embodiments.

FIG. 5 shows the smartphone 100, which is initially in a first position 502 with its display face 410 directed upward. FIG. 5 is consistent with embodiments for which the smartphone 100 determining that it is in a first position includes the smartphone 100 determining that it is being held in the first position by hand. FIG. 5 is also consistent with embodiments for which the smartphone 100 determining that it is in a second position includes determining that is being held between two hands.

A user's left hand 514 supports the smartphone 100 in the first position 502, as detected by the contact sensors 116, 118, for instance, while his right hand 516 is free to operate the smartphone 100. When the user finishes interacting with the smartphone 100, he lifts the smartphone 100 and moves it through a curved trajectory 504 with his left hand 514 about a center of curvature 508. As the smartphone 100 moves translationally along the curved trajectory 504, it also rotates about an axis of rotation 512 located at or near the center of the smartphone 100. At the end of the curved trajectory 504, the user brings the smartphone 100 into his right hand 516 so the smartphone 100 is being held with its display face 410 directed downward between the user's left 514 and right 516 hands in a second position 506.

The rotational motion of the smartphone 100 about the axis of rotation 512 combined with the translational motion of the smartphone 100 along the curved trajectory 504 is equivalent to flipping the smartphone 100 across a distance equal to a trajectory diameter 510 from a face-up to a face-down orientation. The curved trajectory 504 appears semicircular for illustration purposes. In other embodiments, however, a curved trajectory can follow any path that is at least in part nonlinear and ends with the smartphone 100 in a second position with its display face 410 directed downward with respect to gravity.

For an embodiment, the smartphone 100 determining that it is in a second position includes the smartphone 100 determining that a lower hand supporting the smartphone 100 is covering at least a threshold area of the display face 410 of the smartphone 100. The threshold area is a minimum area by which a display face of a device can be covered for the device to determine that it is in a second position with the display face directed downward with respect to gravity. In the second position 506, for example, the smartphone 100 is shown with its entire display face 410 covered by the user's supporting right hand 516. In another display-face-down orientation, the multiple thermal sensors 120, 122, 124, 126, 128, 130 detect that the user's hand is covering less than 50% of the display face 410. As a result, the smartphone 100 determines it is not in a second position. For alternate embodiments, the display 110 of the smartphone 100 is a touchscreen which compliments or replaces the multiple thermal sensors 120, 122, 124, 126, 128, 130 in detecting how much area of the display face 410 is being covered.

In a different embodiment, the smartphone 100 includes one or more proximity detectors used to support a determination that the smartphone 100 is in a second position. For example, the smartphone 100 includes infrared sensors, allowing the smartphone 100 to detect when a user holds the front face 410 of the smartphone 100 against the side of his head while receiving a voice call and to responsively turn off the display 110. The processing element 204 receives and processes proximity data from these sensors while the smartphone 100 is in a second position to determine that at least a threshold area of the display face 410 is being covered.

Setting a threshold area for the smartphone 100 reduces the probability that the smartphone 100 will change its operating state in response to detecting what the user had not intended to be a second position. The user simply walking and swinging his arm while holding his smartphone 100 between his fingers and thumb, for instance, is not intending to change the operating state of his smartphone 100.

Another embodiment reduces the number of false positives the smartphone 100 registers with regard to determining it is in the second position by using a threshold time duration. The threshold time duration is a minimum time for which a display face of a device can be directed downward with respect to gravity and still have the smartphone 100 determine that it is in a second position. In a particular embodiment, at least the threshold area of the display face 410 is covered in addition to the display face 410 being directed downward with respect to gravity for at least the threshold time duration for the smartphone 100 to determine that it is in a second position. In general, the smartphone 100 determining that it is in the second position includes determining that it remains in the second position for at least the threshold time duration.

In further embodiments, the chance of an unintentional change in an operating state of the smartphone 100 is reduced by placing conditions upon the smartphone 100 determining that it is in a first position. For one embodiment, the smartphone 100 determining that it is in the first position includes the smartphone 100 determining that its display 110 is active. In a first case, a display of a device is active when the display is presenting visual information. In a second case, a display of a device is active when the display is powered on and not in a power-saving mode. In a third case, a display of a device is active when a user of the device is interacting with the display. A user simply swinging his smartphone 100 in his hand while walking, for example, does not trigger a change in the operating state for the smartphone 100 because the display 110 is sleeping. With the display 110 sleeping, the smartphone 100 does not register a display-face-down orientation as being in a first position.

Figure 6:
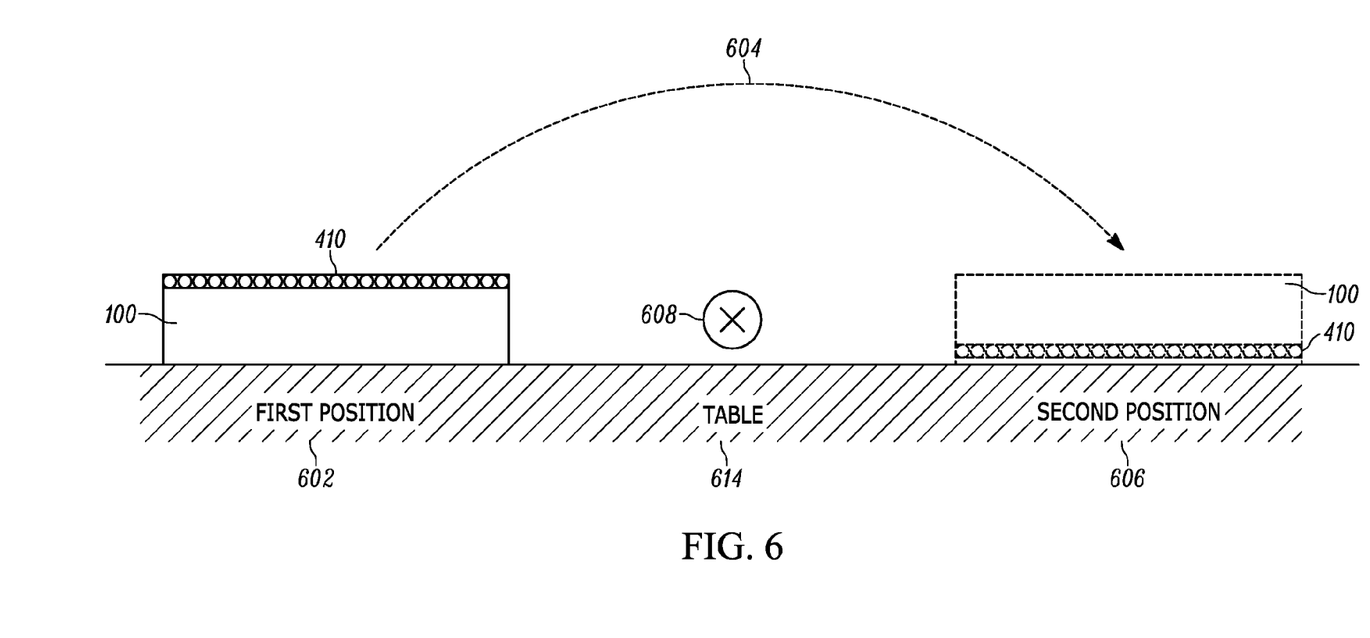
FIG. 6 shows a portable electronic device being moved through a curved trajectory from a first position to a second position, in accordance with some embodiments.
Figure 7:
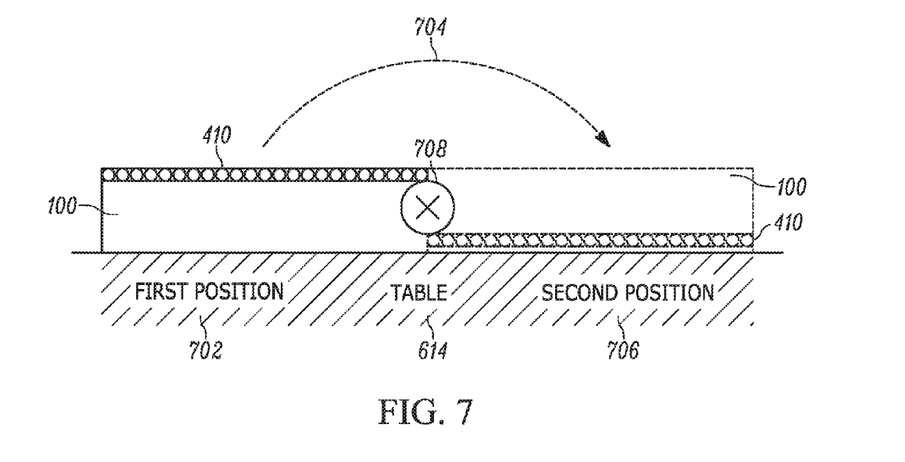
FIG. 7 shows a portable electronic device being moved through a curved trajectory from a first position to a second position, in accordance with some embodiments.
Figure 8:
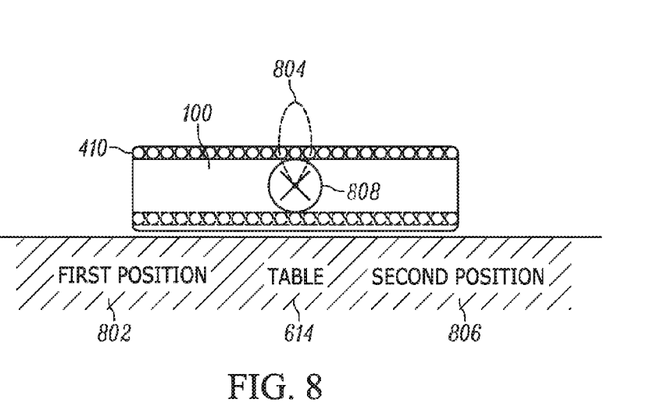
FIG. 8 shows a portable electronic device being moved through a curved trajectory from a first position to a second position, in accordance with some embodiments.

FIGS. 6, 7, and 8 illustrate additional examples of the smartphone 100 undergoing rotational motion through a curved trajectory from a first position to a second position. For the illustrated examples, the smartphone 100 determining that it is in a second position includes the smartphone 100 determining that it is being supported by an object placed against its display face 410. With the smartphone 100 in a display-face-down orientation, the object provides support from underneath which prevents the smartphone 100 from falling or continuing to move in a downward direction. The object, therefore, can be any object of sufficient rigidity and strength to support the weight of the smartphone 100. In FIG. 5, for instance, the smartphone 100 is supported in the second position 506 by a user's right hand 516. In FIGS. 6, 7, and 8, the smartphone 100 is supported in a second position 606, 706, and 806, respectively, by a table 614.

FIGS. 6, 7, and 8 also show the smartphone 100 being rotated through an increasingly shorter curved trajectory, as the smartphone 100 is flipped from a display-face-up first position to a display-face-down second position. FIG. 6 is similar to FIG. 5 in that a center of curvature 608 for a curved trajectory 604 is located in a span that separates a first position 602 of the smartphone 100 from the second position 606 of the smartphone 100. Because the diameter of curvature is greater than the illustrated width of the smartphone 100, the center of curvature 608 is located outside of the smartphone 100. The smartphone 100 is flipped over a distance that is greater than any dimension of the smartphone 100.

In FIG. 7, the smartphone 100 is flipped over its edge from a first position 702 to the second position 706. Because a center of curvature 708 for a curved trajectory 704 is aligned with an edge of the smartphone 100, the diameter of curvature, the distance over which the smartphone 100 is flipped, is equal to the width of the smartphone 100.

In FIG. 8, a center of curvature 808 is located inside the smartphone 100, specifically at the center of the smartphone 100. This results in a curved trajectory 804 for the smartphone 100 degenerating into a single point. The smartphone 100 is flipped in place about its center so that a first position 802 and the second position 806 have the same location. The orientation of the smartphone 100, however, changes from the display face 410 being directed upward to the display face 410 being directed downward. In practice, the rigid table 614 prevents the smartphone 100 from being rotated in place. Because of this, the curved trajectory 804 is actually a small loop that closes on itself at the center of curvature 808 and raises the smartphone 100 high enough over the table 614 to rotate without obstruction.

FIGS. 6, 7, and 8 show that for multiple embodiments, the smartphone 100 having a center of curvature located inside the smartphone 100 results in a curved trajectory having a shorter length than a length for a curved trajectory for which the center of curvature is located outside the smartphone 100. In different embodiments for which a user's position is stationary, the user can flip the smartphone 100 across different diameters of curvature of up to twice a length of his arm. If the user's position is changing as he flips the smartphone 100, then the user can flip the smartphone 100 across a diameter of curvature greater than twice the length of his arm. For example, the smartphone 100 is lying in a first position on one end of a long countertop. The user picks up the smartphone 100 in his hand as he walks by and uses his arm to rotate the smartphone 100 through a curved trajectory as he continues to walk. He then places the smartphone 100 down in a second position on the other end of the countertop.

Returning to FIG. 3, the description of the method 300 continues. After determining 302, 304, 306 that the smartphone 100 underwent rotational motion through a curved trajectory from a first position to a second position, the smartphone 100 responsively changes 308 an operating state of the smartphone 100 from an active state to an inactive state. The smartphone 100 is programmed to process being flipped from a first to a second position as an indication to change its operating state from being active to being inactive. In different embodiments, different operating states are changed, depending upon how the smartphone 100 is programmed. For one embodiment, the smartphone 100 is purchased preprogrammed by a manufacturer to change one or more specific operating states in response to being flipped. In another embodiment, a user of the smartphone 100 can select one or more operating states to change using preference settings.

For a first embodiment, changing an operating state of the smartphone 100 from an active state to an inactive state includes closing an active application executing on the smartphone 100. For example, a user is using a texting application on the smartphone 100. When he is finished using the application, he flips the smartphone 100 over to close the application. In further embodiments, the user flips the smartphone 100 to close a foreground application or to close all open applications.

For a second embodiment, changing an operating state of the smartphone 100 from an active state to an inactive state includes putting the smartphone 100 in a power-saving mode. For example, the user notices remaining battery life is low for the smartphone 100 and flips the smartphone 100 over to put it to sleep.

For a third embodiment, changing the operating state of the smartphone 100 from an active state to an inactive state includes silencing an audible alert associated with an incoming communication and/or dismissing the incoming communication. For example, the smartphone 100 rings as it receives an incoming call while resting on a desk. The user flips the smartphone 100 over to silence the ringing and direct the call to voicemail.

For a fourth embodiment, changing the operating state of the smartphone 100 from an active state to an inactive state includes silencing an audible readout of a notification. The user flips the smartphone 100 to silence the readout. In a further embodiment, flipping the smartphone 100 silences all audible alerts and notifications, placing the smartphone 100 in a silent mode.

By flipping the smartphone 100 over in a motion that is similar to closing a book, the user transitions the smartphone 100 from an active to an inactive operating state. The user can change the operating state without having to rely on fine motor skills or use the dexterity of his finger. The user need not even look at the smartphone 100. He can take hold of the smartphone 100 and flip it over while keeping his attention focused on another task.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   determining that a portable electronic device is in a first position for which a display face of the portable electronic device is directed upward with respect to a downward-directed gravitational field;
   determining that the portable electronic device is undergoing rotational motion through a curved trajectory that takes the portable electronic device from the first position to a second position;
   determining that the portable electronic device is in the second position in which the display face of the portable electronic device is directed downward with respect to the gravitational field, the determining that the portable electronic device is in the second position comprises determining that at least a threshold area of the display face is covered; and
   responsive to the determinations that the portable electronic device underwent the rotational motion from the first position to the second position and that at least the threshold area of the display face is covered, changing an operating state of the portable electronic device from an active state to an inactive state.

2. The method of claim 1, wherein determining that the portable electronic device is in the first position comprises determining that the portable electronic device is held by a hand in the first position based on data received from at least one contact sensor.

3. The method of claim 1, wherein determining that the portable electronic device is in the first position comprises determining that a display located on the display face of the portable electronic device is active.

4. The method of claim 1, wherein the display face of the portable electronic device being directed upward comprises:
   a plane of the display face being level with respect to the gravitational field; or
   the plane of the display face being inclined with respect to the gravitational field.

5. The method of claim 1, wherein the curved trajectory has:
   a first center of curvature that is located inside the portable electronic device resulting in the curved trajectory having a first length; or
   a second center of curvature that is located outside the portable electronic device resulting in the curved trajectory having a second length that is greater than the first length.

6. The method of claim 1, wherein determining that the portable electronic device is in the second position comprises determining that the portable electronic device is supported by an object placed against the display face.

7. The method of claim 1, wherein determining that the portable electronic device is in the second position comprises determining that the portable electronic device is held between two hands.

8. The method of claim 7, wherein determining that the portable electronic device is in the second position comprises determining that a lower hand of the two hands is covering at least the threshold area of the display face of the portable electronic device.

9. The method of claim 1, wherein determining that the portable electronic device is in the second position comprises determining that the portable electronic device remains in the second position for at least a threshold time duration.

10. The method of claim 1, wherein determining that the portable electronic device is in the first position is based on an image captured with a forward-facing camera.

11. The method of claim 1, wherein changing the operating state of the portable electronic device from the active state to the inactive state comprises one or both of:
    silencing an audible alert associated with an incoming communication; or
    dismissing the incoming communication.

12. The method of claim 1, wherein changing the operating state of the portable electronic device from the active state to the inactive state comprises putting the portable electronic device in a power-saving mode.

13. A portable electronic device comprising:
   a display located on a display face of the portable electronic device, wherein the display is configured to visually present information; and
   a processing element operatively coupled to the display, wherein the processing element is configured to:
      determine that the portable electronic device is in a first position for which the display face of the portable electronic device is directed upward with respect to a downward-directed gravitational field;
      determine that the portable electronic device is undergoing rotational motion through a curved trajectory that takes the portable electronic device from the first position to a second position;
      determine that the portable electronic device is in the second position in which the display face of the portable electronic device is directed downward with respect to the gravitational field, the determination that the portable electronic device is in the second position includes to determine that at least a threshold area of the display face is covered; and
      responsive to the determinations that the portable electronic device underwent the rotational motion from the first position to the second position and that at least the threshold area of the display face is covered, change an operating state of the portable electronic device from an active state to an inactive state.

14. The portable electronic device of claim 13 further comprising a gravity sensor configured to detect a direction of the downward-directed gravitational field relative to positions of the portable electronic device, wherein the processing element is operatively coupled to the gravity sensor, and wherein the processing element is further configured to determine the first and second positions using data received from the gravity sensor.

15. The portable electronic device of claim 13 further comprising one or both of:
   an accelerometer configured to detect translational accelerations of the portable electronic device; or
   a gyrometer configured to detect rotational accelerations of the portable electronic device,
   wherein the processing element is operatively coupled to the one or both of the accelerometer or the gyrometer, and wherein the processing element is further configured to determine, using data received from the one or both of the accelerometer or the gyrometer, that the portable electronic device is undergoing the rotational motion through the curved trajectory.

16. The portable electronic device of claim 13 further comprising at least one thermal sensor configured to detect how the portable electronic device is being held, wherein the processing element is operatively coupled to the at least one thermal sensor, and wherein the processing element is further configured to determine, using data received from the at least one thermal sensor, that the portable electronic device is being held in the second position between two hands.

17. The portable electronic device of claim 16, wherein the processing element is further configured to determine, using data received from the at least one thermal sensor, that the portable electronic device is being held with at least the threshold area of the display face of the portable electronic device being covered.

18. The portable electronic device of claim 13 further comprising at least one contact sensor configured to detect how the portable electronic device is being held, wherein the processing element is operatively coupled to the at least one contact sensor, and wherein the processing element is further configured to determine, using data received from the at least one contact sensor, that the portable electronic device is being held in the second position between two hands.

19. The portable electronic device of claim 18, wherein the processing element is further configured to determine, using data received from the at least one contact sensor, that the portable electronic device is being held with at least the threshold area of the display face of the portable electronic device being covered.

20. The portable electronic device of claim 13 further comprising one or both of:
   a forward-facing camera configured to capture imagery from in front of the display face of the portable electronic device, wherein the processing element is operatively coupled to the forward-facing camera, and wherein the processing element is configured to determine, based on the captured imagery, that the portable electronic device is in the first position; or
   a speaker configured to play audible alerts, wherein the processing element is operatively coupled to the speaker, and wherein the processing element is configured to change the operating state of the portable electronic device from the active state to the inactive state by silencing an audible alert being played by the speaker.

* * * * *